United States Patent [19]

Anderson et al.

[11] 4,271,104
[45] Jun. 2, 1981

[54] HOT ROLLING AND EXTRUSION OF OPTICAL FIBER RIBBON CABLE

[75] Inventors: Rogers H. Anderson, Bloomington; Enrique Bernal G., Minnetonka; Di Chen, Hopkins, all of Minn.

[73] Assignee: Honeywell Inc., Minneapolis, Minn.

[21] Appl. No.: 103,247

[22] Filed: Dec. 13, 1979

[51] Int. Cl.³ .............................................. B29D 11/00
[52] U.S. Cl. .................................... 264/1.5; 264/167; 264/177 R
[58] Field of Search ............... 264/1, 325, 332, 177 R, 264/167

[56] References Cited

U.S. PATENT DOCUMENTS 3,574,809  4/1971  Fairbanks .......................... 264/177 R Primary Examiner—John Parrish
Attorney, Agent, or Firm—Omund R. Dahle

[57] ABSTRACT

A method of hot rolling or extrusion of a textured-surface sheet can be used to produce a large one dimensional array of fibers; these arrays can be stacked to form the two dimensional matrix required for image transfer. Alternatively, a flat ribbon can be rolled or extruded and the fiber array formed from it by altering the refractive index of alternate strips using diffusion ion exchange or implantation methods.

6 Claims, 2 Drawing Figures

HOT ROLLING AND EXTRUSION OF OPTICAL FIBER RIBBON CABLE

BACKGROUND AND SUMMARY OF THE INVENTION

Image transfer via optical fibers requires the carefully positioned assembly of very large fiber arrays. Usually this is done by producing a large number of individual fibers and then assembling them in a coherent assembly process which may include the use of a plastic filler material to retain the fibers in the proper alignment. The task of orienting and aligning these fibers can be very difficult. In one prior art method of producing one dimensional arrays individual optic fibers are laid in parallel in a holder and a series of spacers is laid between them. The array is then heated to soften the spacers and bind together the fibers. When the array is cooled the fibers are effectively bound together by the spacers. The arrays so formed may be stacked.

In the present invention directed to the preparation of optical fiber ribbon cable, a flat ribbon is hot rolled or extruded and the fiber array is formed from it (i.e. the individual fibers in the ribbon are delineated) by altering the refractive index of alternate strips using mechanical techniques or diffusion techniques. A textured or corrugated surface ribbon or sheet can also be prepared by hot rolling or extrusion to produce a large one dimensional array of fibers.

DESCRIPTION

The present invention is directed to transparent optical fiber ribbon comprising a plurality of optical fibers adjacent to one another, and methods of fabricating the ribbon fibers. The use of the term optical fiber in this invention is intended to include infrared (IR) fibers. The transparent IR materials used in this invention may be materials such as the silver halides or the thallium halides.

Figure 1:
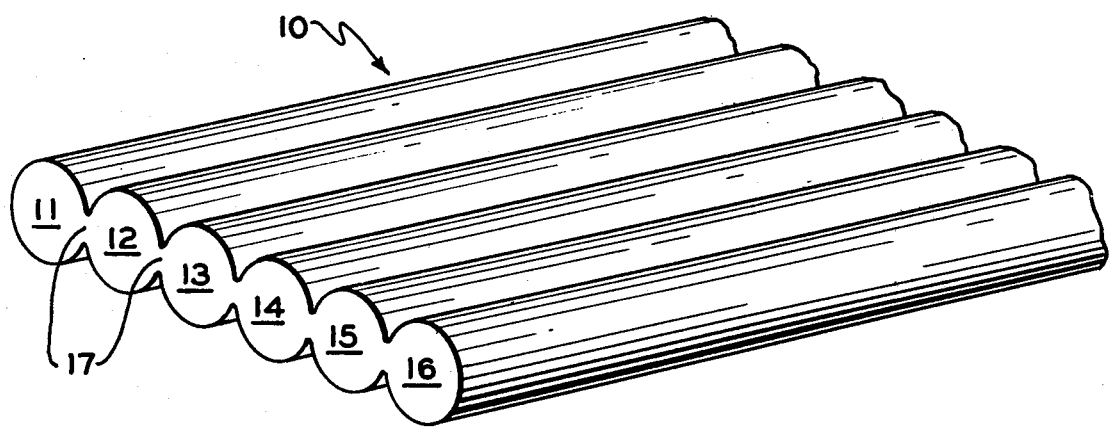
FIG. 1 is a pictorial view of a section of textured-surface ribbon.

In FIG. 1 there is shown a section of a textured surface optical fiber ribbon 10 formed by hot rolling with a corrugated roller. The fiber ribbon 10 can equally well be fabricated by extruding through a similar shaped extrusion die. The result in either case is an array of cylindrical fibers 11 to 16 with edges connected at a reduced thickness area as at 17 in FIG. 1. The amount of crosstalk is related to the interconnect area but can be made negligible if the interconnection region 17 is small. A strain induced effect (photoelastic effect) may also be used in region 17 to provide the separation by the reduction of the refractive index in the interconnection region where there is higher residual strain. A cladding of lower index than the ribbon fiber can be applied to the ribbon after forming or a thin ribbon of lower index can be used to separate the layers of optic ribbon. The ribbon has been shown as being six fibers wide for ease of illustration but may be much wider if desired.

Figure 2:
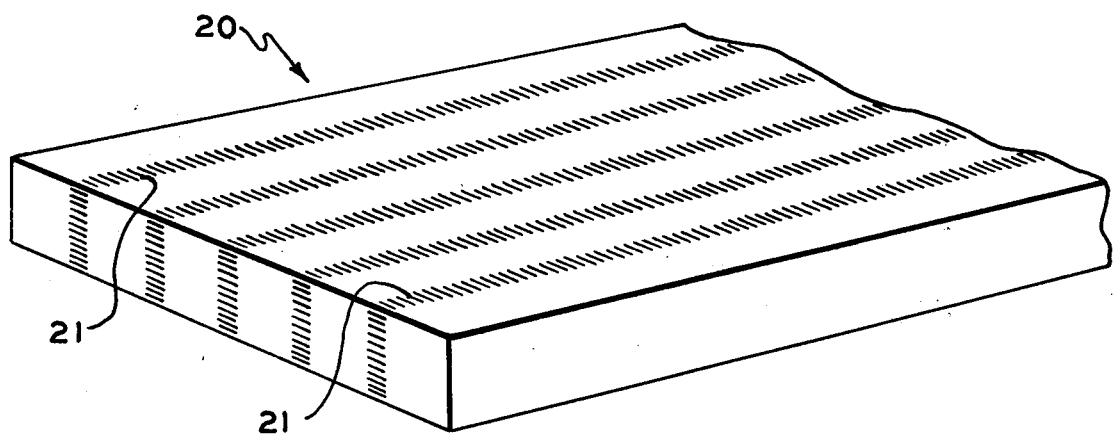
FIG. 2 is a pictorial view of a flat ribbon having alternate strips in which refractive index is modified.

In FIG. 2 there is shown a section of a flat ribbon 20 which is prepared by hot rolling or extrusion. In order to form a plurality of adjacent fibers in the ribbon, longitudinal separation of fibers must then be made by reducing (or increasing) the refractive index at parallel lines delineating the array fibers. For example a strain induced effect (photoelastic effect) may be used to change the index of refraction. In another example photolithography may be used to deposit a barrier mask in the form of parallel lines 21 delineating the array fibers. The modifying of the ribbon material to form alternate regions of high and low refractive index in the ribbon may be accomplished by thermal diffusion, ion exchange or ion implantation. The peak refractive index change, $\Delta n$, is dictated by the required numerical aperture (N.A.) of the IR radiation at the input focal plane, and satisfies the relation.

$$N.A. = \sqrt{2n\Delta n}$$

For typical infrared material with $n \simeq 2.2$, and for $N.A. \simeq 0.3$, we need $\Delta n \simeq 0.02$. This is easily achievable by in-diffusion of AgBr into AgCl, for example.

Incorporated by reference is the subject matter of the copending application Ser. No. 27,958, filed Apr. 9, 1979, entitled "Infrared Fiber of AgCl Clad AgBr and Method of Fabrication", and assigned to the same assignee as the present invention, in which a composite preform of AgCl clad AgBr is drawn into a clad fiber. Both the core and cladding are a halide material and the clad fiber is fabricated by an extrusion process. At elevated temperatures the halide materials become plastic and deform in a manner similar to metals so that it is possible to perform metal-like working operations on them such as extrusion, and rolling. In the present invention, the use of a composite preform as the source material for the hot working operation can be used to produce optically isolated fiber arrays. In one embodiment the preform billet might look similar to the ribbon 20 only of course be much more bulky in size, for example it may be in length from 1-2 feet and in width several inches, while the ribbon might be in the order of $\frac{1}{4}"$ wide, 3-20 mils thick and thousands of feet long. The process step of changing the index of refraction would be more conveniently done with the preform billet rather than with the formed ribbon. Then following the drawing of the ribbon from the preform the separated optic fiber channels already exist in the ribbon.

Another embodiment of the preform is to drill or by other means to make multiple parallel holes in the cladding material and fill in with the core material. This might be done by filling with rods of the core material or by chemical vapor deposition which deposits core material in the holes of the cladding material or such as by crystal growth by solution. The so formed preform is then collapsed, thermally diffused, and extruded as explained above to provide a ribbon of multiple optic channels.

The ribbon fiber array is especially suited for the focal plane image detection application since the fibers within each ribbon are coherently arranged and it is relatively easy to stack ribbons into a two dimensional array. The complication of sorting individual fibers to form a two-dimensional coherent bundle is greatly simplified.

The embodiments of the invention in which an exclusive property or right is claimed are defined as follows:

1. A method for producing a unitary ribbon like sheet of optic fiber which is effectively optically separated into a plurality of parallel optical paths, the method including the steps of:

providing a source of optically transparent material heated to a plastic consistency;

forming the optically transparent material into a ribbon like sheet; and, causing a reducing of the index of refraction along parallel narrow strips of the ribbon like sheet to thereby effectively divide the sheet into a plurality of optical fiber paths wherein said index is reduced by the strain induced effect.

2. The method according to claim 1 in which the optically transparent material is a halide material.

3. The method according to claim 1 in which the optically transparent material is selected from a group consisting of silver halide and thallium halide.

4. The method according to claim 1 in which the optically transparent material is transparent at infrared wavelengths.

5. The method according to claim 1 in which the step of forming is by extruding the ribbon like sheet.

6. The method according to claim 1 in which the step of forming is by hot rolling the ribbon like sheet.

* * * * *